BEARDSLEY & WILCOX.
Burglar Alarm.
No. 82,275. Patented Sept. 22, 1868.
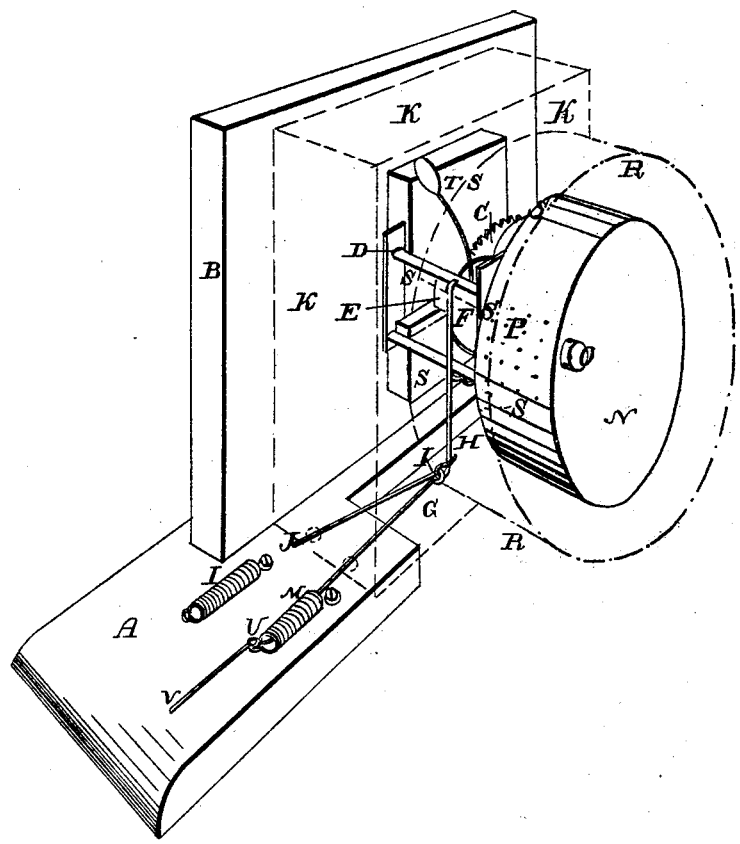

United States Patent Office.

HENRY P. BEARDSLEY AND GEORGE WILCOX, OF CORUNNA, MICHIGAN.

*Letters Patent No. 82,275, dated September 22, 1868.*

IMPROVEMENT IN BURGLAR-ALARMS.

*The Schedule referred to in these Letters Patent and making part of the same.*

TO WHOM IT MAY CONCERN:

Be it known that we, HENRY P. BEARDSLEY and GEORGE WILCOX, of Corunna, in the county of Shiawassee, and State of Michigan, have invented a certain new and useful "Silent Alarm;" and we do declare the following to be a true and accurate description thereof, reference being had to the accompanying drawings, and to the letters of reference marked thereon, and being part of this specification.

The drawing of our invention is in perspective, partially in transparent outline A B are a bed-plate and standard, to which our invention is attached.

C is an ordinary clock-work mechanism, constructed in the usual manner, and provided with the rock-shaft D.

E is a dog, fixed to the rock-shaft D, and engaging with the retaining-catch F on the escape-wheel of the alarm.

T is a weighted lever, secured to rock-shaft D in such a manner that the dog E is caused to enter the retaining-catch F.

H is a pendant-lever, its lower end terminating in a loop, I, and the upper end in and operating the rock-shaft D.

J is a wire rod, secured to the loop on the lever H, with its end projecting through the side of the casing K, (shown in outline.)

L and M are spiral springs, secured, at one end, to the bed-plate A, and furnished with proper loops at the other end.

N is a cylindrical chamber, secured to the pinion-shaft of the clock-work, and revolving with the same.

O is an opening, provided with any suitable means for closing, in which to introduce water to the interior of the cylinder.

P are minute apertures in the periphery of the cylinder, and through which the water in the cylinder is ejected in a fine spray, when rapidly revolved by the clock-work.

R is a double movable casing, (shown in outline,) surrounding the water-chamber N, and provided with openings, S, through which the spray falls on the face of the sleeper.

G is a cord, one end of which is secured to the loop I on the lever H, and the other, being led through the spiral spring M, is secured to the loop U in such a manner that the cord will be "taut" when the dog E is engaged with the retaining-catch F.

V is a cord, leading from the door or window, and secured to the loop U.

K is a casing, (shown in outline,) protecting the working parts of the clock-work from dust, &c.

Having thus described our invention, and named its various parts, we will now proceed to describe the method of operating the same, premising, however, that the apparatus is secured to the head-board of a bed, or any other appropriate place.

The operator removes the double movable casing R, revolves the water-chamber N until the perforations P are uppermost, causing, at the same time, the dog E to engage with the retaining-catch F, where it is held in position by the weighted lever T. He then removes the covering from the opening O, and partially fills the cylinder N with water, replaces the covering, and winds up the main-spring of the clock-work by a proper key at the back of the apparatus, (not shown,) the dog E being held in the catch F by pressing in the rod J with the finger. He then replaces the double casing R, and turns it so that the openings S are so situated that the spray will pass through and fall on the face of the sleeper. The outer and inner shells of the casing R can be so placed, in relation to each other, that the openings S can be enlarged and contracted, or entirely closed, as may be desired. A cord, V, is then led from the door or window to the apparatus, and terminating in a hook, which engages with the loop U of the spring M, when the apparatus is ready for use, as follows: The operator being asleep, a burglar is supposed to raise a window for the purpose of entering the house. One and of the cord V, being attached to the same, is drawn "taut," and, releasing the dog E from the retaining-catch F in the escape-wheel of the clock-work, by means of the cord G, the lever H, and the rock-shaft D, the water-cylinder N is rapidly revolved, and the water is expelled, in a fine spray, by centrifugal force, through the apertures P and the openings S in the casing R, and, falling on the face of the sleeper below, silently awakens him, so that he may take the necessary steps to defend his person and property.

We are aware that other alarms for indicating the presence of burglars are in use, but the noise necessarily made by the alarm to awaken the sleeper serves equally as a warning to the burglars to make their escape; but, in this case, they have no such warning, our invention doing its work in silence, the spray of water, falling on the face of the sleeper, proving effectual in awakening him.

What we claim as our invention, and desire to secure by Letters Patent, is—

1. The water-cylinder N, provided with the opening O and the perforations P, in connection with the clock-work C.

2. The casing R, provided with openings S, when operating with the water-chamber, substantially as described, for the purposes specified.

3. The combination and arrangement of the bed-plate A, standard B, cord or cords V, loop U, springs L and M, rod J, cord G, loop I, lever H, rock-shaft D, weighted lever T, dog E, and catch F, with the clock-work C, water-cylinder N, and casings R and K, all operating in the manner specified, and for the purposes set forth.

<div style="text-align:right">H. P. BEARDSLEY,<br>GEORGE WILCOX.</div>

Witnesses:
    JAMES M. GOODELL,
    C. T. ARMSTRONG.